Aug. 20, 1957     C. OTT     2,803,725
STORAGE BATTERY SAFETY CUTOFF SWITCH
Filed Dec. 17, 1954     2 Sheets-Sheet 1
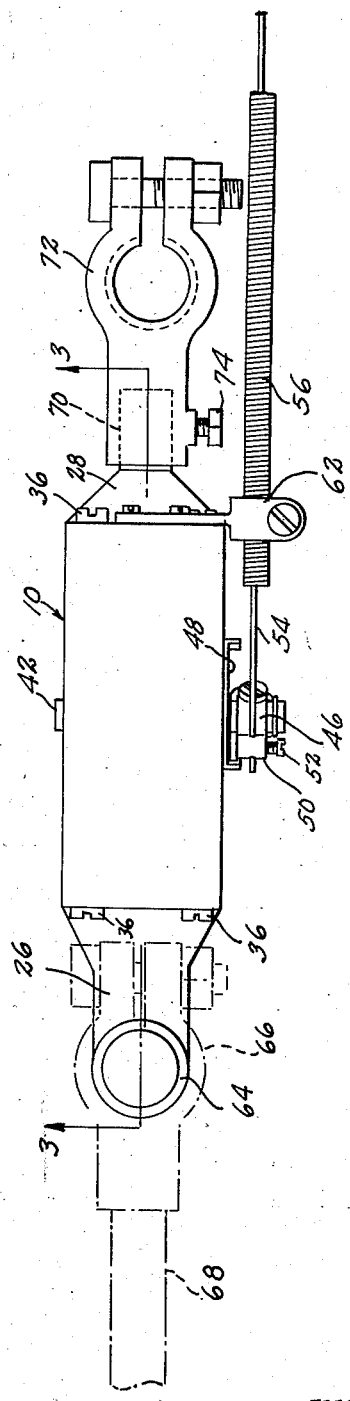
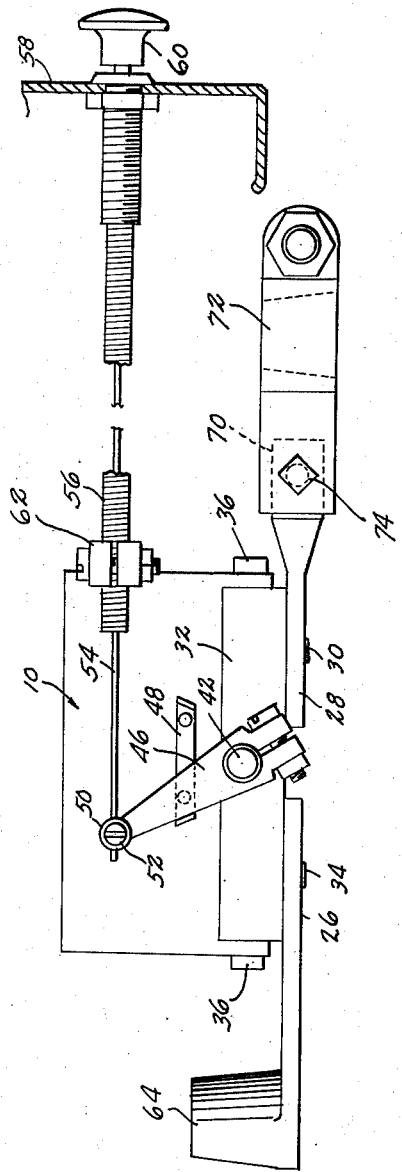
INVENTOR
CARL OTT,
BY
McMorrow, Berman + Davidson
ATTORNEYS Aug. 20, 1957    C. OTT    2,803,725
STORAGE BATTERY SAFETY CUTOFF SWITCH
Filed Dec. 17, 1954    2 Sheets-Sheet 2
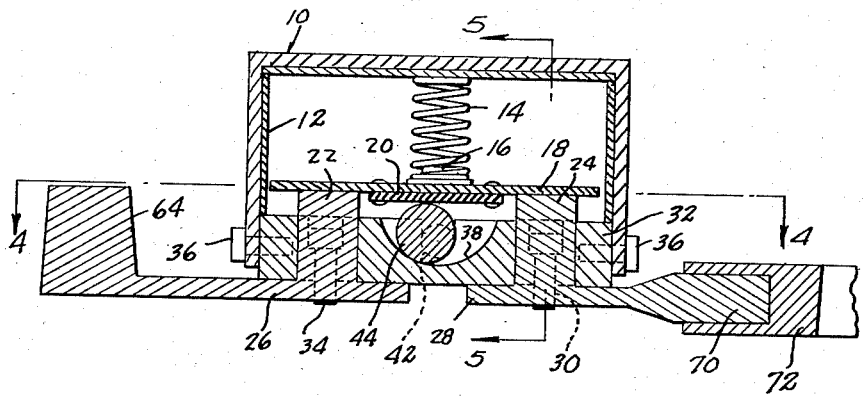
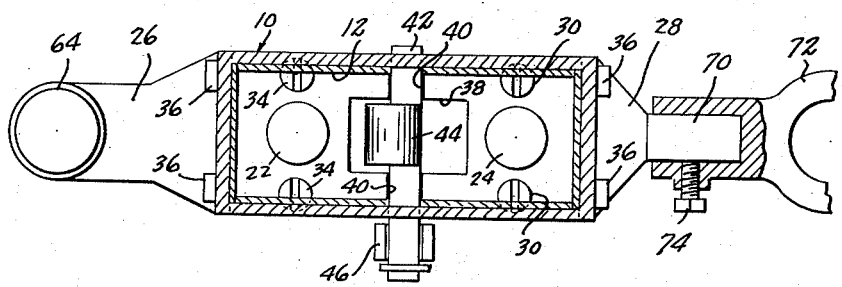
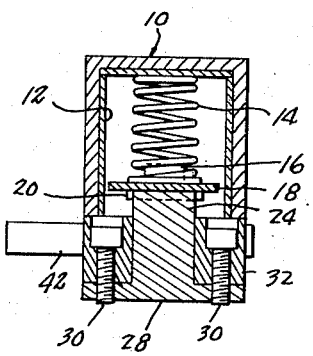
INVENTOR
CARL OTT,
BY
McMorrow, Berman & Davidson
ATTORNEYS United States Patent Office 2,803,725
Patented Aug. 20, 1957

2,803,725
STORAGE BATTERY SAFETY CUTOFF SWITCH
Carl Ott, Clackamas, Oreg.
Application December 17, 1954, Serial No. 475,911
2 Claims. (Cl. 200—161)

This invention relates to a master switch for storage batteries, such as those used in automobiles and other vehicles including tractors, water craft, etc.

The primary purpose of the switch formed in accordance with the present invention is to eliminate the possibility of fire occurring due to a short circuit within the vehicle. Particularly when a vehicle is left unattended over night in a building such as a garage, short circuits occur, and the present invention, when incorporated in the electrical circuit of the vehicle, would prevent short circuits and fires from occurring under these circumstances.

Another object is to provide a master switch as stated which will be conveniently employed while repairs are made to the electrical system of the vehicle.

Still another object is to provide a switch as described which can be mounted in association with a conventional vehicle storage battery without requiring modification or redesign of said battery, in a minimum time and with a minimum amount of difficulty.

Still another object is to provide a device as stated which can be mounted on either the forward or the rear battery post, the device being adapted for reversal so far as important parts thereof are concerned to facilitate these alternative mountings.

Other objects will appear from the following description, the claims appended thereto, and from the annexed drawing, in which like reference characters designate like parts throughout the several views, and wherein:

Figure 1 is a top plan view of a master switch formed in accordance with the present invention, a conventional battery cable and an associated clamp being shown fragmentarily and in dotted outline;

Figure 2 is a side elevational view, an associated instrument panel being illustrated in cross section;

Figure 3 is a longitudinal sectional view on line 3—3 of Figure 1;

Figure 4 is a plan sectional view on line 4—4 of Figure 3; and

Figure 5 is a cross sectional view on line 5—5 of Figure 3.

The reference numeral 10 has been applied generally to a rectangular casing permanently closed at its ends, sides, and top, but formed open at its bottom. The casing is lined throughout with electrical insulation 12, and abutting at its upper end against the top wall of the casing, centrally of the casing, is a compression spring 14, the other end of which seats against a boss 16 mounted upon a rectangular contact or bridging plate 18 of electrically conductive material, to the underside of which is secured a separator 20 of electrical insulation material.

The opposite ends of the bridging or contact plate 18 are adapted to seat, in one position of the parts, against upwardly projecting, cylindrical contacts 22, 24 rigid at their lower ends with conductor plates 26, 28 disposed below the lower end of the casing or housing 10. A pair of screws 30 are threaded into transversely aligned openings of plate 28 (Figure 5), through smooth walled openings provided in one end of a relatively thick base plate 32 of electrical insulation material, closing the open lower end of the casing 10. Similar threaded openings are provided in the conductive plate 26, receiving screws 34 engaged in registering openings of the base plate 32 adjacent the other end of the base plate. Screws 36 are threaded into the opposite end surfaces of the base plate 32, through registering, smooth-walled openings formed in the opposite end walls of the casing 10, to fixedly secure the base plate in place within the casing.

Formed in the upper surface of the base plate 32, so as to face inwardly of the housing, is a centrally disposed recess 38 having an arcuate bottom curved through 180°. The opposite side walls of the recess are formed with transversely aligned bearing recesses 40, receiving a trunnion or rock shaft 42, the opposite ends of which project through openings formed in the opposite side walls of the base plate 32.

Fixedly secured to the intermediate portion of the shaft 42 is an eccentric 44, contacting the arcuate bottom surface of the recess 38. The separator 20 bears against the upper surface of the eccentric as shown in Figure 3, and in one position to which the shaft 42 is rotated, the eccentric will be disposed as shown in Figure 3, permitting the opposite ends of the bridging element 18 to engage the contacts 22, 24 to permit an electrical circuit to be closed through the conductor plates 26, 28. When the shaft 42 is rocked to another position, the eccentric will raise the plate 18 out of engagement with the contacts 22, 24 breaking said circuit.

Clamped to one of the projecting ends of the rock shaft 42, for the purpose of rocking said shaft in opposite directions, is a radially extending control arm 46 (Figure 2) the range of movement in opposite directions of which is limited by an abutment plate 48 secured to the adjacent side of the casing 10. To the outer end of the control arm 46 there is rotatably connected a cable-attaching lug 50, in which is threaded a screw 52. Lug 50 has a diametrically extending opening in which is engaged, by means of screw 52, one end of a flexible steel cable 54 extending within a cable housing 56 of flexible construction. Housing 56 extends to the instrument panel 58 of the vehicle, the cable 54 projecting out of the housing 56 through the instrument panel and being equipped within the driver's compartment with a push-pull knob 60 to cause the arm 46 to be shifted between its opposite extreme positions for opening and closing the circuit. To mount the cable housing 56 in proper position relative to the casing, there is provided a cable housing support clamp 62 attached by screws to one end of the housing 10.

The conductor plate 26, beyond the opposite end of the housing 10, is integrally formed with an upwardly projecting, tapering post 64, of a cross sectional size and shape approximating those of a conventional battery post. A battery clamp 66, which would normally be engaged with said battery post, is removed from the post and is instead connected to the post 64, receiving said post 64 in the manner shown in Figure 1. A battery cable 68 is attached to the terminal clamp 66 in the regular manner.

On the projecting end of conductor plate 28 there is integrally formed a stub 70 engaging in an axial socket formed in a terminal clamp 72 which is attached securely to the stub 70 by a set screw 74. Clamp 72 is adapted to receive the battery post that would ordinarily be received in the clamp 66 were the switch not being used.

By reason of the arrangement illustrated, it is seen that it is merely necessary, to install the clamp on the storage battery, that the clamp 66 be removed from the forward battery post, after which the clamp 72 is engaged with said forward battery post while the clamp 66 is connected to the upstanding sleeve-like element 64 of plate 26. Thereafter, by mounting the flexible cable and its associated housing in the instrument panel 58, the device is ready for use, to permit a master control switching device for the storage battery, positively insuring against short circuits when the vehicle is left unattended.

Under some circumstances, it may be desired to mount the device on the rear battery post. In this event, the switch would be turned end for end from the position shown in Figures 1 and 2. The bracket 62, under these circumstances, would be mounted upon the other end of the casing 10, said other end of the casing 10 being provided, under such circumstances, with openings receiving the bracket attaching screws. Then, the control arm 46 would be turned clockwise from the position thereof shown in Figure 2. The control arm stop means 48 would also be removed from the position shown, and would be relocated to another position longitudinally of the casing 10. These changes are considered sufficiently obvious as not to require special illustration herein.

It is also to be understood that in some instances the switch would be used without the flexible control cable. This would be true, it is believed, in most tractor installations.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A storage battery master switch comprising a base plate; a casing closed at its ends, sides, and top, and open at the bottom, positioned upon said plate so that the open bottom receives said base plate with the top spaced above and parallel to said base plate, means securing said base plate to said casing, a pair of contacts positioned within said casing and fixedly attached to said base plate, conductor plates on the respective contacts respectively adapted for connection one to a battery post and the other to a battery cable clamp; a bridge disposed within the casing; a compression spring interposed between and operatively connected to the casing top and the bridge for biasing the bridge in a direction to shift the same into bridging relation to the contacts; and manually operable means extending into the casing for shifting the bridge out of engagement with the contacts against the restraint of the spring loading thereof, including a rock shaft journalled in opposite walls in the casing medially between the contacts, an eccentric rigid with said rock shaft within the casing and underlying the midlength portion of the bridge, the axis of the rock shaft being disposed inwardly of the circumference of the eccentric, and a radial arm on the rock shaft outside the casing for rocking the same in opposite directions, said eccentric when rocked with the rock shaft in one direction biasing the bridge out of engagement with said contacts.

2. A storage battery master switch comprising: an electrically insulative base plate of elongated formation having openings formed therein adjacent its ends, said base plate having medially between the openings, upwardly opening, transversely aligned bearing recesses opening upon opposite sides of the bearing plate, said bearing plate having a centrally positioned, upwardly opening recess communicating at its opposite sides with the respective bearing recesses and having a curved bottom; a pair of contacts extending through said openings of the base plate and projecting upwardly above the base plate, said contacts including means projecting beyond the opposite ends of the base plate for receiving a battery post and battery clamp, respectively; a bridging plate of electrically conductive material supported at its ends upon the respective contacts; an eccentric of cylindrical formation seated in the last named recess in contact with the curved bottom thereof; a rock shaft supported rotatably at its ends in the respective bearing recesses and having its intermediate portions secured fixedly to said eccentric, the axis of rotation of the rock shaft being disposed inwardly from the circumference of the eccentric; a separator plate of electrically insulative material secured to the underside of said bridging plate intermediate opposite ends thereof, said eccentric bearing against the separator plate at a location approximately medially between the opposite ends of the bridging plate, and being proportioned, when rotated in one direction responsive to turning of the rock shaft in the same direction, to elevate the bridging plate out of engagement with the respective contacts, said eccentric on being rotated in the opposite direction being adapted to permit lowering of the bridging plate into engagement with the respective contacts; an open-bottomed casing receiving the base plate and having downwardly opening slots receiving the rock shaft ends, said base plate closing the casing at the open bottom thereof; fastening elements extending through the casing into the base plate to fixedly secure the casing to the base plate; and a compression spring held under compression between the top wall of the casing and the midlength portion of said bridging plate, so as to exert a continuous, resilient, yielding pressure against the bridging plate tending to shift the same into engagement with the contacts.

References Cited in the file of this patent
UNITED STATES PATENTS

| | | |
|---|---|---|
| 2,545,965 | McCamon | Mar. 20, 1951 |
| 2,559,055 | Warren | July 3, 1951 |
| 2,722,583 | Ammann | Nov. 1, 1955 |